United States Patent
Münning et al.

(10) Patent No.: US 12,391,251 B2
(45) Date of Patent: Aug. 19, 2025

(54) METHOD FOR OPERATING A DRIVER-ASSISTANCE SYSTEM, AND VEHICLE HAVING A DRIVER-ASSISTANCE SYSTEM

(71) Applicant: Volkswagen Aktiengesellschaft, Wolfsburg (DE)

(72) Inventors: Daniel Münning, Braunschweig (DE); Thomas Günterberg, Wolfsburg (DE); Hendrik Oschlies, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 193 days.

(21) Appl. No.: 18/555,650

(22) PCT Filed: Apr. 5, 2022

(86) PCT No.: PCT/EP2022/058929
§ 371 (c)(1),
(2) Date: Oct. 16, 2023

(87) PCT Pub. No.: WO2022/218745
PCT Pub. Date: Oct. 20, 2022

(65) Prior Publication Data
US 2024/0208499 A1 Jun. 27, 2024

(30) Foreign Application Priority Data
Apr. 16, 2021 (DE) .......................... 102021203786.0

(51) Int. Cl.
*B60W 30/14* (2006.01)
*B60W 30/18* (2012.01)
*B60W 50/14* (2020.01)

(52) U.S. Cl.
CPC .... *B60W 30/143* (2013.01); *B60W 30/18145* (2013.01); *B60W 50/14* (2013.01); *B60W 2520/105* (2013.01); *B60W 2554/804* (2020.02); *B60W 2556/65* (2020.02)

(58) Field of Classification Search
None
See application file for complete search history.

(56) References Cited

U.S. PATENT DOCUMENTS

| | | |
|---|---|---|
| 8,903,593 B1 | 12/2014 | Addepalli et al. |
| 9,387,860 B2 | 7/2016 | Dorum et al. |
| 2002/0032514 A1 | 3/2002 | Kuroda et al. |
| 2015/0154864 A1 | 6/2015 | Hainzlmaier et al. |
| 2020/0180617 A1 | 6/2020 | Tezuka et al. |

FOREIGN PATENT DOCUMENTS

| | | | |
|---|---|---|---|
| DE | 102012009238 A1 | 11/2012 | |
| DE | 102011083039 B4 | 3/2013 | |
| DE | 102012216910 A1 | 3/2013 | |
| EP | 2862773 A2 * | 4/2015 | ............ B60W 30/00 |

OTHER PUBLICATIONS

PCT/EP2022/058929. International Search Report (Aug. 8, 2022).
Priority German Application No. 102021203786.0. Examination Report (Jan. 21, 2022).

* cited by examiner

*Primary Examiner* — Wade Miles
*Assistant Examiner* — Jerrod Irvin Davis
(74) *Attorney, Agent, or Firm* — Peter Zura; LOZA & LOZA, LLP

(57) ABSTRACT

Technologies and techniques for operating a driver-assistance system of a vehicle, in which the driver-assistance system at least indirectly takes into account a travelling speed of at least one other vehicle, at which the at least one other vehicle has driven around a bend ahead of the vehicle in the travelling direction of the vehicle. A travelling speed of the vehicle provided by the driver-assistance system for driving around the bend is checked, with the travelling speed of the at least one other vehicle being at least indirectly taking into account for this check. Other aspects relate to a method directed to a driver-assistance system.

23 Claims, 2 Drawing Sheets

METHOD FOR OPERATING A DRIVER-ASSISTANCE SYSTEM, AND VEHICLE HAVING A DRIVER-ASSISTANCE SYSTEM

RELATED APPLICATIONS

The present application claims priority to International Patent Application No. PCT/EP2022/058929 to Münning et al., filed Apr. 5, 2022, titled "Method For Operating A Driver-Assistance System, And Vehicle Having A Driver-Assistance System," which claims priority to German Pat. App. No. 10 2021 203 786.0 filed Apr. 16, 2021, to Münning et al., the contents of each being incorporated by reference in their entirety herein.

TECHNICAL FIELD

The present disclosure relates to technologies and techniques for operating a driver assistance system of a vehicle, in which the driver assistance system at least indirectly takes a driving speed of at least one other vehicle into account, particularly when the at least one other vehicle has negotiated a curve located ahead of the vehicle in the driving direction of the vehicle at a driving speed. The present disclosure furthermore relates to a vehicle comprising a driver assistance system.

BACKGROUND

DE 10 2012 009 238 A1 describes a method for the anticipatory longitudinal guidance of a vehicle. An information-generating vehicle, which is located ahead of a longitudinally guided vehicle on the same driving route in the same driving direction, transmits external information, which is analyzed, to the longitudinally guided vehicle. Based on the external information, driving recommendations for the longitudinal guidance of the longitudinally guided vehicle are output, or control commands for the intervention in a subordinate driver assistance system for the longitudinal guidance of the longitudinally guided vehicle are generated.

U.S. Pat. No. 9,387,860 B2 describes a use of probe data in a driver assistance system of a vehicle. The probe data indicates the actual driving behavior of drivers, for example how these accelerate or decelerate when negotiating a curve on a road. When the vehicle equipped with the driver assistance system enters this curve too quickly, the driver of the vehicle can be warned, or the vehicle can be decelerated by means of the driver assistance system.

Additional methods in which a driving behavior of other vehicles is analyzed are described in U.S. Pat. No. 8,903,593 B1 and US 2015/0154864 A1, for example.

SUMMARY

Aspects of the present disclosure are directed to improving techniques for operating a driver assistance system and to provide a vehicle comprising such a driver assistance system.

Some aspects of the present disclosure relating to the methods and associated vehicle are recited in the independent claims. Advantageous embodiments including expedient refinements of the present disclosure are described in the dependent claims and in the following description.

In some examples, a method is disclosed for operating a driver assistance system of a vehicle. The driver assistance system at least indirectly takes a driving speed of at least one other vehicle into account, at which the at least one other vehicle has negotiated a curve situated ahead of the vehicle in the driving direction of the vehicle. A driving speed of the vehicle intended by the driver assistance system for the negotiation of the curve is checked, and the driving speed of the at least one other vehicle is at least indirectly taken into account for this check.

Advantages and preferred embodiments described for the method according to the present disclosure also apply to the vehicle according to the present disclosure, and vice versa. Accordingly, the present disclosure also encompasses refinements of the vehicle that include features as described in connection with the method according to the present disclosure. For this reason, the corresponding refinements of the vehicle according to the present disclosure are not described again here.

The present disclosure also encompasses the combinations of the features of the described embodiments.

DESCRIPTION OF THE DRAWINGS

Exemplary embodiments of the present disclosure are described hereafter. In the drawings.

DETAILED DESCRIPTION

Figure 1:
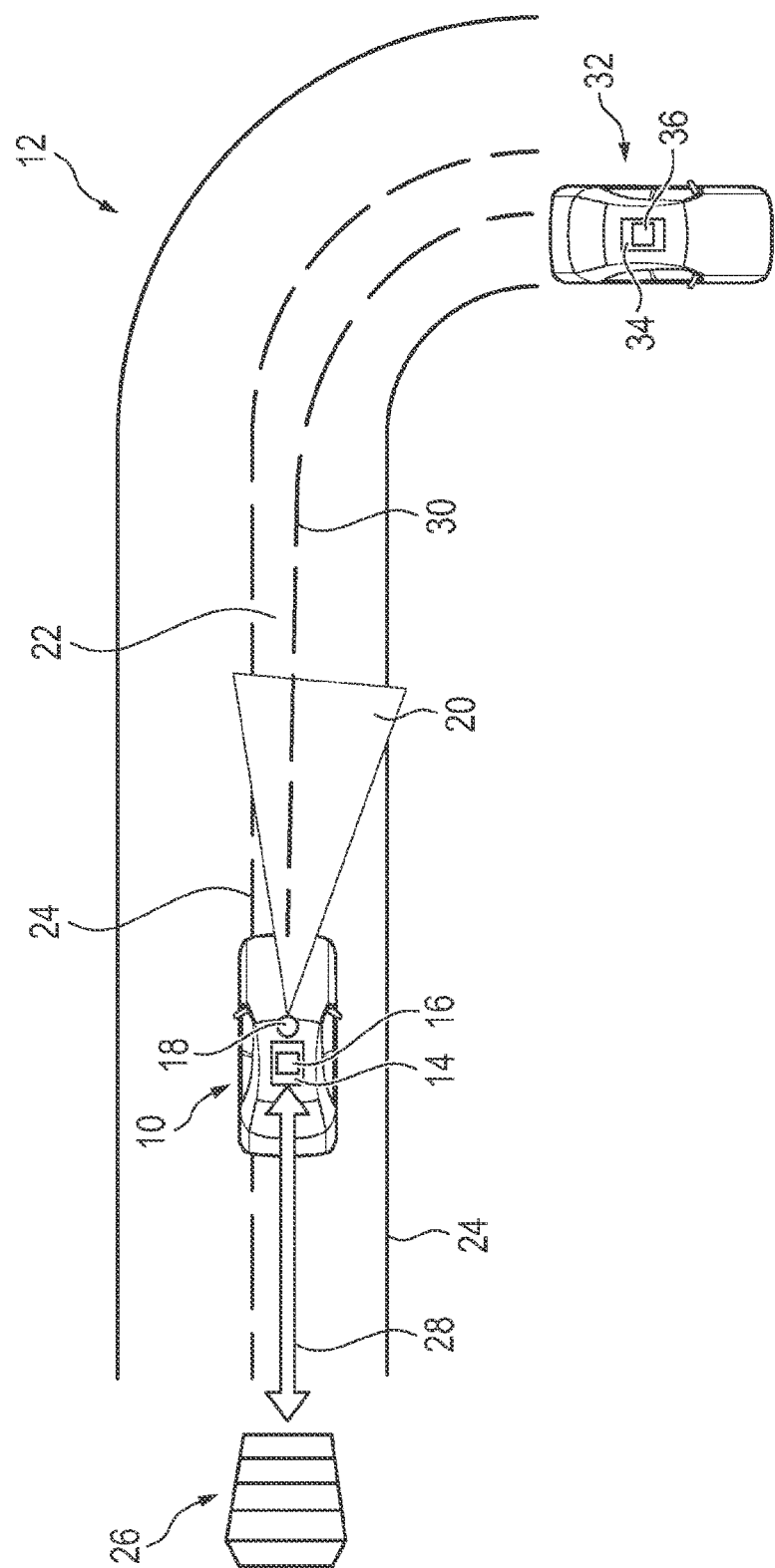
FIG. 1 illustrates an operating environment in which a vehicle equipped with a driver assistance system approaches a curve, with swarm data being transmitted to the driver assistance system, according to some aspects of the present disclosure.

The exemplary embodiments described hereafter are preferred exemplary embodiments of the present disclosure. In the exemplary embodiments, the described components in each case represent individual features of the present disclosure which are to be considered independently of one another and which also refine the present disclosure independently of one another and, as a result, shall also be considered to be an integral part of the present disclosure, either individually or in a combination other than the one shown. Furthermore, the described exemplary embodiments can also be supplemented with additional of the above-described features of the present disclosure.

In the figures, functionally equivalent elements are each denoted by the same reference numerals.

The disclosed technologies and techniques for operating a driver assistance system of a vehicle are based on the realization that a driving speed intended by the driver assistance system for the negotiation of the curve possibly does not correspond to an appropriate driving speed, in light of the actual negotiability of the curve, or possibly does not appear appropriate to a driver of the vehicle equipped with the driver assistance system. This can be taken into account in the present disclosure, since the driving speed of the at least one other vehicle is at least indirectly used for checking the driving speed that is intended for the negotiation of the curve. As a result, an improved method for operating the driver assistance system is provided herein.

Subsequent to the check of the intended driving speed, the driver assistance system decides as to whether the intended driving speed is decreased or maintained. In this way, an enhanced driving experience can be achieved when the curve is negotiated by the vehicle comprising the driver assistance system.

When the intended driving speed is maintained, a laterally guiding component of the driver assistance system is deactivated. This is based on the realization that otherwise, that is, when the laterally guiding component of the driver assistance system remains active, a strong decrease in the driving speed that is unwelcome by the driver could be carried out by the driver assistance system. By deactivating the laterally guiding component of the driver assistance system, confusion of the driver in this regard can be substantially avoided.

Moreover, the technologies and techniques disclosed herein are based on the realization that a driver assistance system having a laterally guiding component is subject to certain regulatory framework conditions. The laterally guiding component of the driver assistance system, or the component of the driver assistance system effectuating a lateral guidance of the vehicle, ensures, for example, that the vehicle does not depart from a traffic lane or roadway. For this purpose, a corresponding sensor system of the vehicle or of the driver assistance system can detect roadway markings or the like.

Framework conditions that relate to laterally guiding driver assistance systems or to the laterally guiding component of a driver assistance system are regulated, amongst others, in UN ECE R79. This regulation, for example, specifies a maximum transverse acceleration that the vehicle negotiating a curve by means of the laterally guiding driver assistance system is permitted to have at the most. If a driving speed is now intended by the driver assistance system, taking into account such a maximum transverse acceleration of the vehicle during the negotiation of the curve, this intended driving speed may deviate from the driving speed at which the at least one other vehicle has already negotiated the curve. For example, by taking such a deviation into account when checking the intended driving speed, the driver assistance system can adapt the intended driving speed. This results in an enhanced driving experience for the driver who negotiates the curve with the vehicle comprising the driver assistance system.

When directly taking into account the driving speed of the at least one other vehicle that is present at a particular point of the curve, the driving speed of the at least one other vehicle can be directly incorporated in the check. In contrast, a parameter correlating with the driving speed of the other vehicle or derived from this driving speed, for example a transverse acceleration, may be taken into account when indirectly taking the driving speed of the at least one other vehicle into account. The transverse acceleration present at a particular point of the curve is dependent on the respective driving speed of the other vehicle present at this point and the curve radius present at this location or this point. Both the direct consideration of the driving speed and the indirect consideration of the driving speed by way of the at least one derived parameter can be easily carried out by the driver assistance system in terms of technology.

Preferably, the driver assistance system takes into account respective driving speeds of a plurality of other vehicles that are present in each case during the negotiation of the curve. The intended driving speed is compared to at least one reference speed, which is ascertained from at least a portion of the respective driving speeds. As a result of the consideration of such swarm data, which provides information about the driving behavior of a corresponding number of other vehicles, it is possible to establish with increased reliability whether or not the intended driving speed is appropriate for the negotiation of the curve.

In some examples, the at least one reference speed can be transmitted to the driver assistance system from a vehicle-external memory device, such as a server. This makes the method particularly low in complexity.

In addition, or as an alternative, the reference speed can be determined by the driver assistance system in that the respective driving speeds of the other vehicles which the other vehicles had at each point of the curve while negotiating the curve are transmitted to the driver assistance system. The driver assistance system is thus able to exert influence particularly well on which other vehicles' respective driving speeds are to be used for determining the at least one reference speed. This, in turn, ensures that the comparison of the intended driving speed to the at least one reference speed is very suitable or appropriate for the driving situation of the vehicle comprising the driver assistance system.

The at least one reference speed can, for example, be an average speed of the other vehicles during the negotiation of the curve, that is, the average speed that the other vehicles had at every point of the curve. Such a reference speed can be determined particularly easily in the form of a mean value.

In particular when other vehicles are negotiating the curve while being steered by a driver of the respective other vehicle, that is, without a driver assistance system of the respective other vehicle being active, the respective driving speeds of the other vehicles can deviate comparatively drastically from one another. The reason is that the driving speed of the respective other vehicle then only depends on how spirited or how cautiously or defensively the particular driver of the other vehicle is negotiating the curve. When such other vehicles not guided by a driver assistance system are taken into account during the determination of the reference speed, this can result in a determined reference speed that is only conditionally suited for the comparison to the intended driving speed.

Preferably, those other vehicles in which a laterally guiding component of a driver assistance system of the respective other vehicle was active during the negotiation of the curve are taken into account for the determination of the at least one reference speed. The reference speed is then particularly meaningful for the comparison or for comparing it to the intended driving speed. If it was possible without difficulty to negotiate the curve at a driving speed other than the intended driving speed even though a laterally guiding component of the driver assistance system of the respective other vehicle was activated, a potential adaptation of the intended driving speed is also unproblematic. This is due to the fact that the reference speed already demonstrated its suitability during the negotiation of the curve by means of the other vehicle while a laterally guiding component was activated or active.

Preferably, the driver assistance system takes a version of the laterally guiding component of the driver assistance system into account for the determination of the at least one reference speed. This is based on the realization that different permissible transverse accelerations of the other vehicle during the negotiation of the curve can be stored or implemented in different versions of the laterally guiding component. For example, in a first version of the laterally guiding component, a lower transverse acceleration may have been permissible than in a second, in particular subsequent version of the laterally guiding component. If the second version of the laterally guiding component also allows the curve to be negotiated while being laterally guided by the driver assistance system, this can advantageously be taken into account during a potential adaptation of the intended driving speed.

It has furthermore been shown to be advantageous when the driver assistance system takes a vehicle model of the respective other vehicle into account for the determination of the at least one reference speed. The intended driving speed can then be compared particularly well to the reference speed since, for example, it is possible to use vehicle models of the other vehicles which are identical to the model of the vehicle for the determination of the reference speed.

The driver assistance system can indirectly take the driving speed of the at least one other vehicle into account by comparing a transverse acceleration of the at least one other vehicle during the negotiation of the curve to a predetermined limit value of the transverse acceleration for the check of the intended driving speed. By using the transverse acceleration during the check of the intended driving speed, it is advantageously easily possible for the driver assistance system to establish whether the intended driving speed should be adapted.

Similarly, a transverse acceleration that arises as a result of the intended driving speed during the negotiation of the curve, taking a route of the at least one other vehicle into account, can be compared to the predetermined limit value of the transverse acceleration for the check of the intended driving speed.

When such a comparison shows that a deviation from the limit value is present, in particular the limit value is exceeded, a corresponding adaptation of the intended driving speed can be carried out.

The transverse acceleration is preferably determined using data from a plurality of other vehicles. The transverse acceleration used for the comparison to the predetermined limit value is then particularly meaningful.

Preferably, in particular those other vehicles are taken into account in which a laterally guiding component of a driver assistance system of the respective other vehicle was active during the negotiation of the curve It is then ensured that those other vehicles which are particularly well-suited for the comparison are taken into account during the determination of the transverse acceleration.

The driver assistance system preferably processes a version of the laterally guiding component of the driver assistance system and/or a respective vehicle model of the other vehicles into account. This results in improved meaningfulness of the transverse acceleration of the other vehicles which is to be compared to the predetermined limit value or of the transverse acceleration present at the intended driving speed.

The transverse acceleration of the at least one other vehicle can be transmitted to the driver assistance system from a vehicle-external memory device, for example from a server on which swarm data, such as the transverse acceleration of a plurality of other vehicles, is stored. This is associated with a particularly low effort since the transverse acceleration is made directly available to the driver assistance system.

Similarly, the at least one reference speed can be transmitted to the driver assistance system from the vehicle-external memory device. Here, the advantages described with respect to the direct transmission of the transverse acceleration apply accordingly.

In addition, or as an alternative, the driver assistance system can determine the transverse acceleration of the at least one other vehicle based on a route of the at least one other vehicle during the negotiation of the curve or the driving speed of the at least one vehicle which is present along the route. The driver assistance system is then only provided with the swarm data in the form of the route and the driving speed present along the route as raw data, and the driver assistance system determines the transverse acceleration from this information. The driver assistance system can thus in particular exert influence on which other vehicles' transverse acceleration is to be taken into account. This enables a change or an adaptation that is particularly realistic or adapted particularly well to the circumstances or allows the intended driving speed to be maintained based on the transverse acceleration.

Preferably, an alternative speed that deviates from the intended driving speed is determined based on the comparison of the transverse acceleration to the limit value. In the process, the driver assistance system assesses a deviation of the alternative speed from the intended driving speed. As a result of this assessment, the driver assistance system can exert influence on whether or not the driver assistance system is to use the alternative speed, instead of the intended driving speed, as the longitudinal speed of the vehicle that is set for the negotiation of the curve.

During the assessment, it is possible, in particular, to take into account to what extent the alternative speed will be assessed as being appropriate for the negotiation of the curve by a driver of the vehicle comprising the driver assistance system. In this way, particularly high acceptance can be achieved during an implementation of the alternative speed.

Preferably, at least one notice is output to a driver of the vehicle as a result of the check. The at least one notice output to the driver can include a prompt to take over a lateral guidance of the vehicle. Accordingly, the driver can be prompted, for example, as a result of the output of the at least one notice to use at least one hand, in particular both hands, to grab a steering handle of the vehicle, which is in particular designed as a steering wheel. If the driver has already grabbed the steering handle with at least one hand, the driver's attention, as a result of the output of the notice, can be drawn to the fact that the lateral guidance of the vehicle is now being transferred to the driver. In particular, the driving speed intended by the driver assistance system can then be maintained, with solely the driver taking over the lateral guidance of the vehicle, while the driver assistance system sets, in particular controls, the driving speed in the form of the longitudinal speed.

In some examples, the prompt may be output in multiple warning stages. These warning stages can be used consecutively or cumulatively, if the driver does not respond to a respective preceding warning stage as desired. In this way, it can be achieved particularly reliably that the driver in fact takes over the lateral guidance of the vehicle. The prompt can be output in the form of text and/or in the form of a voice message and/or in the form of a vibration of the steering handle or the like. In particular, these manners of outputting the notice can form the individual warning stages, which can be used consecutively or cumulatively.

In addition, or as an alternative, the at least one notice output to the driver can include a communication of an alternative speed deviating from the intended driving speed. The driver can thus be informed about the fact that the driver assistance system intends to drive the motor vehicle through the curve at the alternative speed, instead of the intended driving speed. This helps to ensure that the driver is not confused by the motor vehicle then negotiating the curve at the alternative speed.

In some examples, an alternative speed deviating from the intended driving speed may be confirmed by the driver. For example, the driver assistance system can thus propose to the driver not to negotiate the curve at the originally intended driving speed, but at an alternative speed that is decreased compared thereto. By the driver confirming, the driver provides his or her agreement to this decreased in the driving speed. It is also possible to achieve in this way that the driver does not become confused when the curve is then negotiated at the alternative speed.

In some examples, a vehicle is configured with a driver assistance system according to the present disclosure. The driver assistance system is configured to at least indirectly take a driving speed of at least one other vehicle into account, at which the at least one other vehicle has negotiated a curve situated ahead of the vehicle in the driving direction of the vehicle. The driver assistance system is furthermore designed to check a driving speed of the vehicle that is intended by the driver assistance system for the negotiation of the curve, and to take the driving speed of the at least one other vehicle at least indirectly into account for this check. The driver assistance system is configured to decide, subsequent to the check of the intended driving speed, as to whether the intended driving speed is being decreased or maintained. The driver assistance system is designed to deactivate a laterally guiding component of the driver assistance system when the intended driving speed is being maintained. The vehicle comprising the driver assistance system is thus designed to carry out the methods according to the present disclosure. The vehicle consequently comprises an improved driver assistance system.

FIG. 1 shows a high-level schematic illustration of an operating environment in which a vehicle 10, which in the present example is configured as a motor vehicle, for example in the form of a passenger car, approaches a curve 12. The vehicle 10 comprises a driver assistance system 14, which is only shown in a highly schematic illustration in FIG. 1. The driver assistance system 14 can ensure a longitudinal guidance of the vehicle 10 and, in the process, maintain a longitudinal speed adjusted or set by a driver (not shown) of the vehicle 10, for example, which is also referred to as a set speed. In particular, the driver assistance system 14 can take a distance with respect to a preceding further vehicle (not shown in the present example) into account and accordingly decelerate the vehicle 10 when this distance is at risk of falling short of a predetermined limit value.

Furthermore, the driver assistance system 14 can be provided with navigation data via a navigation system (not shown in the present example) of the vehicle 10. The radius of the curve 12 can be determined comparatively roughly based on such navigation data.

If the driving speed or set speed set by the driver cannot be maintained due to the radius of the curve 12, the longitudinally guiding driver assistance system 14 can accordingly decrease this set speed. This can also take place when, as described above, a minimum distance with respect to a preceding vehicle or similar road user is to be maintained.

For the purpose of the longitudinal guidance of the vehicle 10, the vehicle 10 can comprise at least one sensor (not shown in the present example), for example in the form of a radar sensor or the like, by means of which, for example, the distance with respect to a preceding vehicle can be detected.

In the present example, the driver assistance system 14 also comprises a laterally guiding component 16, which is likewise only shown in a highly schematic illustration in FIG. 1. For the lateral guidance of the vehicle 10, which is effectuated by means of the laterally guiding component 16 of the driver assistance system 14, the vehicle 10 can comprise a sensor, such as a camera 18, as shown by way of example in the present example. A region 20 that is located ahead of the vehicle 10 in the driving direction of the vehicle 10 can be detected or captured by means of the camera 18. In particular, it is possible to detect by means of the camera 18 whether the vehicle 10 is departing from a traffic lane 22, which, according to FIG. 1, is laterally delimited by means of roadway markings 24. The laterally guiding component 16 of the driver assistance system 14, when activated or active, then ensures that the vehicle 10 does not depart from the traffic lane 22.

In the present example, the driver assistance system 14 of the vehicle 10 is furthermore designed to receive swarm data, which can be provided by a vehicle-external device, for example in the form of a server 26 shown schematically in FIG. 1. The transmission of data to the server 26, for example by the vehicle 10, and the reception of data, in particular swarm data, from the server 26 by the vehicle 10 are illustrated by a double arrow 28 in FIG. 1.

In the present example, the driver assistance system 14 can be designed in such a way that, when the driver assistance system 14 is activated by the driver of the vehicle 10, the longitudinal guidance and the lateral guidance effectuated by the laterally guiding component 16 are activated or active at the same time. Regulatory framework conditions, such as those established in UN ECE R79, for example, must be observed for laterally guiding driver assistance system or for the laterally guiding component 16 of the driver assistance system 14.

For example, this regulation specifies a maximum permitted transverse acceleration for the vehicle 10 when the vehicle 10 is being moved by way of an activated laterally guiding component 16, and in particular is negotiating the curve 12. For example, this maximum permitted transverse acceleration can be 3 m/s$^2$. It is possible that the driver assistance system 14 decreases the driving speed of the vehicle 10 during the negotiation of the curve 12 so as not to exceed this maximum permitted transverse acceleration. This can in particular result in the vehicle 10 being decelerated considerably more strongly during the negotiation of the curve 12 that would be necessary or appropriate based on the curve radius. This can be avoided by means of the driver assistance system 14, as will be described hereafter.

The driver assistance system 14 checks the driving speed intended for the negotiation of the curve 12, taking swarm data into account, which is made available to the driver assistance system 14 by the server 26, for example. The swarm data can indicate a route 30, which is schematically shown in FIG. 1. Along this route 30, at least one other vehicle 32, which is likewise schematically shown in FIG. 1, has negotiated the curve 12 temporally before the vehicle 10.

In some examples, the route 30 is preferably formed of a plurality of individual routes along which a plurality of other vehicles 32 have already negotiated the curve 12. An average route (30) can be determined by evaluating image data transmitted from the other vehicles 32 to the server 26. The image data can be camera data, for example, which was recorded by means of a camera (not shown) of the respective other vehicle 32 and transmitted to the server 26.

Based on the swarm data indicating the route 30, the actual radius of the curve 12 can be determined with considerably greater precision than is the case based on the navigation data or map data present in the navigation system (not shown) of the vehicle 10.

The swarm data furthermore encompasses a driving speed of the respective other vehicle 32 during the negotiation of the curve 12. For each point along the route 30, the server 26 can thus determine the driving speed of the respective other vehicle 32 corresponding to this point or present at this point and make this available to the driver assistance system 14 of the vehicle 10.

In some examples, the swarm data includes the information as to how fast a plurality of other vehicles 32 have already negotiated the curve 12. In particular, the swarm data can thus include the average speed at which the other vehicles 32 have negotiated the curve 12 along the average route 30.

From the information of the driving speed at every point of the route 30 and the curve radius, it is possible, with great precision, to determine, and in particular determine by way of the server 26, the average transverse acceleration acting at each point of the curve 12 on the other vehicles 32.

The server 26 can transmit the raw data, in the form of the driving speeds of the other vehicles 32 and the average route 30 of the other vehicles 32, to the driver assistance system 14 of the vehicle 10 prior to entering the curve 12. From this raw data, it is then possible for the driver assistance system 14 to determine the transverse acceleration of the other vehicles 32 which is present at the particular point along the route 30. However, it is also possible for the server 26 to already transmit to the vehicle 10 the respective transverse acceleration along the route 30 determined based on the driving speed of the other vehicles 32 and the actual radius of the curve 12.

If it turns out, for example, that the other vehicles 32 on average negotiated the curve 12 at a higher driving speed than is intended by the driver assistance system 14, the driving speed or longitudinal speed intended or predicted by the driver assistance system 14 for the negotiation of the curve 12, with an active laterally guiding component 16, can be adapted. In particular, the vehicle 10 can be guided through the curve 12 by means of the driver assistance system 14 at a higher intended longitudinal speed than would be the case if the laterally guiding component 16 of the driver assistance system 14 were active or activated.

The driver assistance system 14 can furthermore take into account whether the other vehicles 32 were guided through the curve 12 by means of a driver assistance system 34 in which a laterally guiding component 36 was active or activated. This makes it possible to establish that, even with active lateral guidance of the other vehicle 32, a maximum transverse acceleration of the other vehicle 32 was possibly reached which, even though it observes the regulatory framework conditions, is higher than the transverse acceleration permitted by the laterally guiding component 16 of the driver assistance system 14 that the vehicle 10 approaching the curve 12 comprises.

In some examples, such a configuration may arise when the respective version of the driver assistance system 34 of the other vehicle 32, and in particular of the laterally guiding component 36 of this driver assistance system 34, is taken into account. If, for example, a more recent version of the laterally guiding component 36 of the other vehicle 32 permits a higher transverse acceleration than the (older) version of the laterally guiding component 16 of the vehicle 10, this can be taken into account when the longitudinal speed is specified, or when the driving speed of the vehicle 10 predicted or intended for the negotiation of the curve 12 is specified. With such a configuration of the driver assistance system 14 of the vehicle 10, a higher driving speed can accordingly be provided for the negotiation of the curve 12 than would in fact or originally have been intended based on the version of the laterally guiding component 16.

The set speed, that is, the driving speed intended by the driver assistance system 14 of the vehicle 10 during the negotiation of the curve 12, can thus, for example, be adapted based on swarm data.

In some examples, a respective vehicle model of the other vehicle 32 can be taken into account in the process. If, for example, another vehicle 32 that has a design identical to that of the vehicle 10 negotiates the curve 12 at a higher driving speed, with the laterally guiding component 36 being activated, than is intended by the driver assistance system 14 with an activated associated laterally guiding component 16, then the intended driving speed or longitudinal speed of the vehicle 10 can be accordingly adapted by the driver assistance system 14. In addition, or as an alternative, the set speed or the driving speed of the vehicle 10 intended by the driver assistance system 14 during the negotiation of the curve 12 can thus be adapted or adjusted based on the respective vehicle model of the other vehicles 32.

As another aspect, the driver assistance system 14 can take into account the extent to which the driver of the vehicle 10 is prepared to accept, for example, a decrease in the driving speed of the vehicle 10 during the negotiation of the curve 12. The decrease in the driving speed can be due to the fact that the laterally guiding component 16 of the driver assistance system 14 during the lateral guidance of the vehicle 10 ensures that a certain transverse acceleration is not exceeded. In particular, however, when this transverse acceleration permitted by the laterally guiding component 16 is lower than the transverse acceleration that is permitted by the laterally guiding component 36 of the other vehicles 32 for models of the other vehicles 32 having a design identical to that of the vehicle 10, this acceptance may be comparatively low. If the driver assistance system 14 thus takes into account the acceptance of the driver during the adaptation of the set speed or of the intended driving speed of the vehicle 10, this can result in an enhanced driving experience for the driver of the vehicle 10 during the negotiation of the curve 12.

Possible procedures during the implementation of corresponding methods in the driver assistance system 14 shall be described with reference to FIG. 2.

Figure 2:
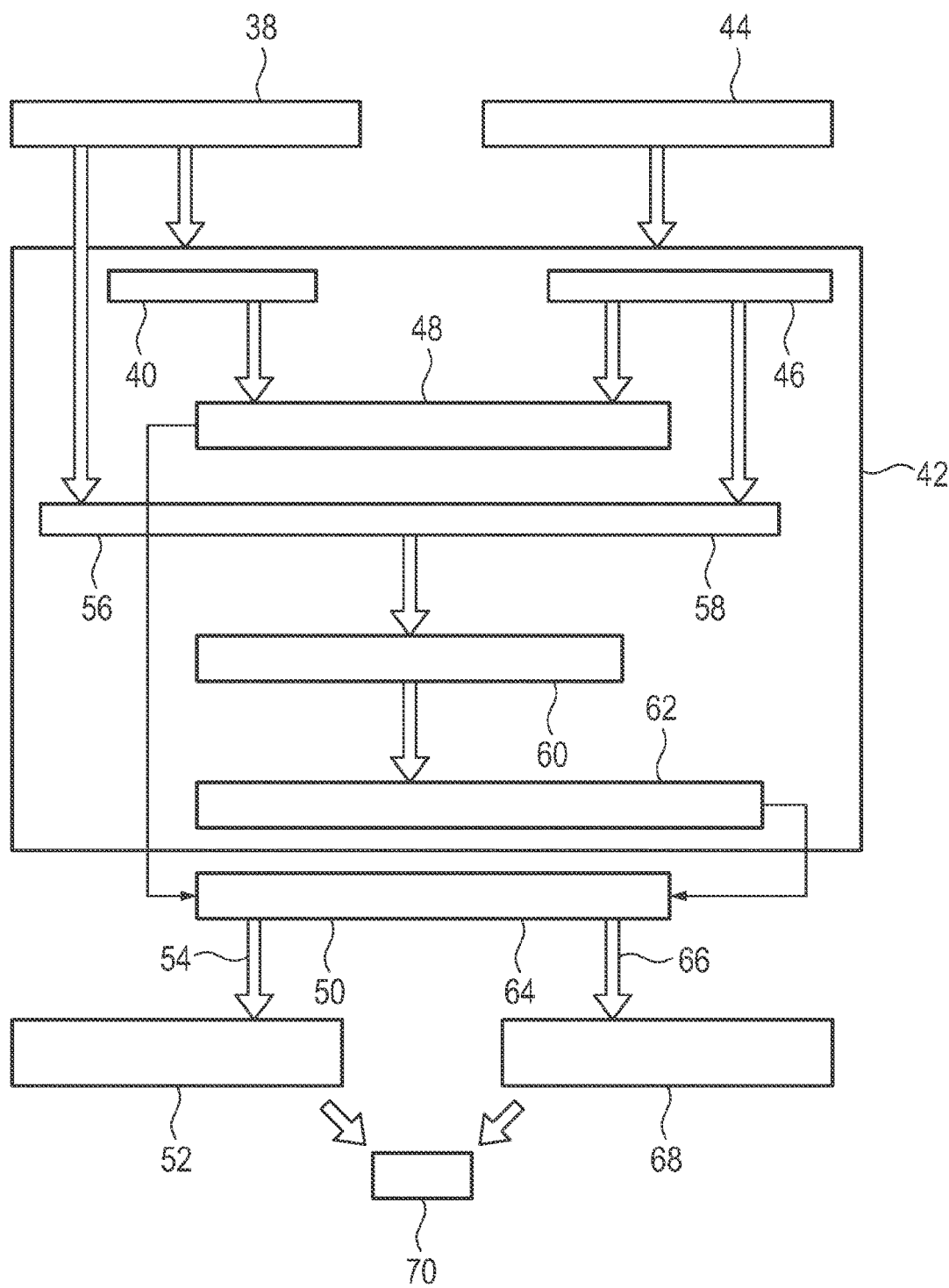
FIG. 2 shows a flow chart, which illustrates options for using the swarm data for adapting an intended or predicted longitudinal speed of the vehicle, according to some aspects of the present disclosure.

For example, according to FIG. 2, data 38 indicating the route 30 of the other vehicles 32 can be supplied to the driver assistance system 14 of the vehicle 10. In particular, such swarm data can accordingly be taken into account by the driver assistance system 14. Swarm data transmitted, for example, from the server 26 to the driver assistance system 14 can moreover include an average driving speed 40 that the other vehicles 32 had at a particular point along the route 30 during the negotiation of the curve 12.

Furthermore, a driving speed 44 that the vehicle 10 has when approaching the curve 12 can be incorporated in a decision block 42 shown schematically in FIG. 2. This driving speed 44 can be the speed driven by the driver of the vehicle 10, which the vehicle 10 has at the moment at which the driver of the vehicle 10 has activated the driver assistance system 14. Taking this driving speed 44 into account, the activated driver assistance system 14 determines a driving speed 46 intended for the negotiation of the curve 12 in the form of a predicted longitudinal speed of the vehicle 10.

In a comparison step 48, it is now checked, for example, whether the predicted longitudinal speed or intended driving speed 46 is greater than the swarm speed or average driving speed 40 of the other vehicles 32 during the negotiation of the curve 12. In particular, it may be taken into account in the process which vehicle model the other vehicles 32 had, and whether the other vehicles 32 had the driver assistance system 34 including the laterally guiding component 36 (refer to FIG. 1).

In a subsequent step, a result 50 of the comparison step 48 is considered. If the result 50 is that the intended driving speed 46 is greater than the average swarm speed of the other vehicles 32, in particular of those other vehicles 32 that are identical to the vehicle 10 in terms of the vehicle model, and moreover comprised the activated laterally guiding component 36, the predicted longitudinal speed, that is, the intended driving speed 46, is decreased 52. A corresponding path from the result 50 to the decrease 52 is illustrated by an arrow 54 in FIG. 2.

According to FIG. 2, the swarm data can furthermore encompass a transverse acceleration 56 along the route 30, which is dependent on the average driving speed 40 of the other vehicles 32. The transverse acceleration 56 can be made directly available to the driver assistance system 14 by the server 26 (refer to FIG. 1). In addition, or as an alternative, the transverse acceleration 56 can be determined by the driver assistance system 14 based on the swarm data in the form of the driving speed 40 and the data 38 indicating the route 30.

Similarly, a transverse acceleration 58 can be determined, in particular calculated, by the driver assistance system 14, which will arise when the curve 12 is negotiated at the intended driving speed 46, taking the data 38 indicating the route 30 into account.

During a subsequent comparison 60, it is possible to check whether the transverse acceleration 56 or the transverse acceleration 58 is greater than a predetermined limit value. The predetermined limit value can in particular encompass a certain tolerance. For example, it is possible to check whether the transverse acceleration 56, 58 is greater than the predetermined limit value per se, or greater than the predetermined limit value including the tolerance, that is, greater than a base value increased by the tolerance. The predetermined limit value can in particular be a limit value that must be adhered to, based on a regulation to be observed.

If the comparison 60 shows that the transverse acceleration 56, 58 exceeds the predetermined limit value, the driver assistance system 14 determines an alternative speed deviating from the intended driving speed 46 in the decision block 42. In a subsequent assessment step 62, it is preferably checked or assessed whether a corresponding deviation of the alternative speed from the originally intended driving speed 46 is acceptable to the driver of the vehicle 10.

For example, a longitudinal guidance component of the driver assistance system 14 of the vehicle 10 can provide a driving speed 46 for the negotiation of a curve at which a higher transverse acceleration 58 occurs than would be permissible according to the predetermined limit value. In contrast, the alternative speed determined taking the limit value into account, and thus using the laterally guiding component 16, is lower. In the assessment step 62, it is then possible to assess or check whether a downward deviation of the alternative speed from the intended driving speed 46 is to be permitted. In the assessment step 62, it can in particular be considered what deviation of the alternative speed from the intended driving speed 46 the driver of the vehicle 10 is prepared to accept.

The method also arrives at a result 64 similarly to the result 50 from the assessment step 62. If the assessment shows that the deviation of the alternative speed from the intended driving speed 46 is reasonable, the intended driving speed 46 is decreased 52 in accordance with the arrow 54. Accordingly, the longitudinal speed is controlled to the alternative speed by the driver assistance system 14 during the negotiation of the curve 12, with the laterally guiding component 16 remaining activated.

If, in contrast, the result 50 or the result 64 is a no, as is illustrated by another arrow 66 in FIG. 2, the intended driving speed 46, that is, the predicted longitudinal speed of the vehicle 10, is maintained 68. In this case, the laterally guiding component 16 of the driver assistance system 14 is deactivated.

In both instances, that is, both when the longitudinal speed is decreased 52 to the alternative speed and when the predicted longitudinal speed is maintained 68, a notice 70 can be output to the driver of the vehicle 10. The notice 70 can, for example, include the prompt that the driver of the vehicle 10 must take over the lateral guidance of the vehicle 10. The reason is that, if the laterally guiding component 16 no longer solely effectuates the lateral guidance of the vehicle 10 during the negotiation of the curve 12, care must be taken that this lateral guidance is taken over by the driver of the vehicle 10.

In addition, or as an alternative, the content of the notice 70 may be that the intended driving speed 46 or the predicted longitudinal speed is decreased to the alternative speed or that the driver assistance system 14 intends to carry out this decrease 52.

In some examples, it may be communicated to the driver of the vehicle 10, for example, that the decrease 52 in the longitudinal speed is intended, even though the driver of the vehicle 10 had originally specified a different set speed or longitudinal speed. It may be provided in this regard that the driver confirms the notice 70, and thus provides his or her agreement for a decrease 52 in the set speed to be carried out.

In some examples, when the notice 70 reads that the driver of the vehicle 10 must take over the lateral guidance of the vehicle 10, it is useful to output the notice 70 so as to warn the driver of the vehicle 10 in this regard. A corresponding warning can be output in the form of a text message and/or an acoustic signal and/or a voice message or the like.

For example, the driver of the vehicle 10 may be prompted to grab a steering wheel of the vehicle 10 with both hands. If it is established that the driver of the vehicle 10 is already holding the steering wheel with one hand, the driver of the vehicle 10 may also be urged or prompted by a vibration of the steering wheel to grab the steering wheel with both hands, and thereby ensure the lateral guidance of the vehicle 10 during the negotiation of the curve 12 at the non-decreased longitudinal speed in a particularly safe manner.

In some examples, it may be provided that at least one parameter, such as the intended driving speed 46 and/or the limit value to be used during the comparison 60 and/or at least one circumstance used during the assessment step 62 can be accordingly programmed or applied. In this way, such parameters of the driver assistance system 14 can be adapted or changed when this proves to be useful or desirable.

Overall, the examples demonstrate how an improved method for controlling the longitudinal speed can be implemented in the driver assistance system 14 of the vehicle 10, in particular when negotiating the curve 12.

LIST OF REFERENCE NUMERALS

10 vehicle
12 curve 14 driver assistance system
16 component
18 camera
20 region
22 traffic lane
24 roadway marking
26 server
28 double arrow
30 route
32 other vehicle
34 driver assistance system
36 component
38 data
40 driving speed
42 decision block
44 driving speed
46 driving speed
48 comparison step
50 result
52 decreasing
54 arrow
56 transverse acceleration
58 transverse acceleration
60 comparison
62 assessment step
64 result
66 arrow
68 maintaining
70 notice

The invention claimed is:

1. A method for operating a driver assistance system of a vehicle, comprising:
processing a driving speed of at least one other vehicle in the driver assistance system, wherein processing the driving speed of at least one other vehicle comprises processing data relating to the at least one other vehicle negotiating a curve ahead of the vehicle in a driving direction of the vehicle;
checking a driving speed of the vehicle for a negotiation of the curve that is configured by the driver assistance system, based on the driving speed of the at least one other vehicle;
configuring, via the driver assistance system, whether the checked driving speed is decreased or maintained; and
deactivating a laterally guiding component of the driver assistance system when the checked driving speed is maintained.

2. The method according to claim 1, further comprising processing, via the driver assistance system, respective driving speeds of a plurality of other vehicles that are present during the negotiation of the curve, and comparing the configured driving speed to at least one reference speed, which is determined from at least a portion of the respective driving speeds of the plurality of other vehicles.

3. The method according to claim 2, wherein the processing of the respective driving speeds of the plurality of other vehicles that are present during the negotiation of the curve comprises:
determining which of the plurality of other vehicles activated a respective laterally guiding component of a respective driver assistance system during the negotiation of the curve for the determining of the at least one reference speed.

4. The method according to claim 2, further comprising processing, via the driver assistance system, a version of the laterally guiding component of the driver assistance system and/or a respective vehicle model of the other vehicles into account for the determining of the at least one reference speed.

5. The method according to claim 1, further comprising processing, via the driver assistance system, the driving speed of the at least one other vehicle by comparing a transverse acceleration of the at least one other vehicle during the negotiation of the curve and/or a transverse acceleration that arises as a result of the intended driving speed during the negotiation of the curve, and processing a route of the at least one other vehicle to a predetermined limit value of the transverse acceleration for the check of the configured driving speed.

6. The method according to claim 5, further comprising transmitting the transverse acceleration of the at least one other vehicle to the driver assistance system from a vehicle-external memory device, and/or the driver assistance system determines the transverse acceleration of the at least one other vehicle based on a route of the at least one other vehicle during the negotiation of the curve and the driving speed of the at least one other vehicle present along the route.

7. The method according to claim 5, further comprising determining an alternative speed that deviates from the intended driving speed, based on the comparison of the transverse acceleration to the predetermined limit value, the driver assistance system further determining a deviation of the alternative speed from the intended driving speed.

8. The method according to claim 1, further comprising outputting at least one notice to the vehicle as a result of the check, the at least one notice comprising (i) a prompt, configured as a plurality of warning stages, to take over a lateral guidance of the vehicle, and/or (ii) a communication of an alternative speed deviating from the configured driving speed.

9. A vehicle, comprising:
a memory; and
a driver assistance system, operatively coupled to the memory, the driver assistance system being configured to
process a driving speed of at least one other vehicle, wherein the driver assistance system is configured to process the driving speed of at least one other vehicle by processing data relating to the at least one other vehicle negotiating a curve ahead of the vehicle in a driving direction of the vehicle;
check a driving speed of the vehicle for a negotiation of the curve, based on the driving speed of the at least one other vehicle;
configure whether the checked driving speed is decreased or maintained; and
deactivate a laterally guiding component of the driver assistance system when the checked driving speed is maintained.

10. The vehicle according to claim 9, wherein the driver assistance system is further configured to process respective driving speeds of a plurality of other vehicles that are present during the negotiation of the curve, and compare the configured driving speed to at least one reference speed, which is determined from at least a portion of the respective driving speeds of the plurality of other vehicles.

11. The vehicle according to claim 10, wherein the driver assistance system is further configured to process the respective driving speeds of the plurality of other vehicles that are present during the negotiation of the curve by:
determining which of the plurality of other vehicles activated a respective laterally guiding component of a respective driver assistance system during the negotiation of the curve for the determining of the at least one reference speed.

12. The vehicle according to claim 10, wherein the driver assistance system is further configured to process a version of the laterally guiding component of the driver assistance system and/or a respective vehicle model of the other vehicles into account for the determining of the at least one reference speed.

13. The vehicle according to claim 9, wherein the driver assistance system is further configured to
process the driving speed of the at least one other vehicle by comparing a transverse acceleration of the at least one other vehicle during the negotiation of the curve and/or a transverse acceleration that arises as a result of the intended driving speed during the negotiation of the curve, and
processing a route of the at least one other vehicle to a predetermined limit value of the transverse acceleration for the check of the configured driving speed.

14. The vehicle according to claim 13, wherein the driver assistance system is further configured to transmit the transverse acceleration of the at least one other vehicle to the driver assistance system from a vehicle-external memory device, and/or determine the transverse acceleration of the at least one other vehicle based on a route of the at least one other vehicle during the negotiation of the curve and the driving speed of the at least one other vehicle present along the route.

15. The vehicle according to claim 13, wherein the driver assistance system is further configured to determine an alternative speed that deviates from the intended driving speed, based on the comparison of the transverse acceleration to the predetermined limit value, and determine a deviation of the alternative speed from the intended driving speed.

16. The vehicle according to claim 9, wherein the driver assistance system is further configured to output at least one notice to the vehicle as a result of the check, the at least one notice comprising (i) a prompt, configured as a plurality of warning stages, to take over a lateral guidance of the vehicle, and/or (ii) a communication of an alternative speed deviating from the configured driving speed.

17. A method for operating a driver assistance system of a vehicle, comprising:
processing (i) a driving speed of at least one other vehicle in the driver assistance system, wherein processing the driving speed of at least one other vehicle comprises processing data relating to the at least one other vehicle negotiating a curve ahead of the vehicle in a driving direction of the vehicle, and (ii) processing, via the driver assistance system, respective driving speeds of a plurality of other vehicles that are present during the negotiation of the curve;
checking a driving speed of the vehicle for a negotiation of the curve that is configured by the driver assistance system, based on the driving speed of the at least one other vehicle;
configuring, via the driver assistance system, whether the checked driving speed is decreased or maintained; and
deactivating a laterally guiding component of the driver assistance system when the checked driving speed is maintained.

18. The method according to claim 17, further comprising comparing the configured driving speed to at least one reference speed, which is determined from at least a portion of the respective driving speeds of the plurality of other vehicles.

19. The method according to claim 18, wherein the processing of the respective driving speeds of the plurality of other vehicles that are present during the negotiation of the curve comprises:
determining which of the plurality of other vehicles activated a respective laterally guiding component of a respective driver assistance system during the negotiation of the curve for the determining of the at least one reference speed.

20. The method according to claim 18, further comprising processing, via the driver assistance system, a version of the laterally guiding component of the driver assistance system and/or a respective vehicle model of the other vehicles into account for the determining of the at least one reference speed.

21. The method according to claim 17, further comprising processing, via the driver assistance system, the driving speed of the at least one other vehicle by comparing a transverse acceleration of the at least one other vehicle during the negotiation of the curve and/or a transverse acceleration that arises as a result of the intended driving speed during the negotiation of the curve, and
processing a route of the at least one other vehicle to a predetermined limit value of the transverse acceleration for the check of the configured driving speed.

22. The method according to claim 21, further comprising transmitting the transverse acceleration of the at least one other vehicle to the driver assistance system from a vehicle-external memory device, and/or the driver assistance system determines the transverse acceleration of the at least one other vehicle based on a route of the at least one other vehicle during the negotiation of the curve and the driving speed of the at least one other vehicle present along the route.

23. The method according to claim 21, further comprising determining an alternative speed that deviates from the intended driving speed, based on the comparison of the transverse acceleration to the predetermined limit value, the driver assistance system further determining a deviation of the alternative speed from the intended driving speed.

* * * * *